US006373463B1

(12) United States Patent
Beeks (10) Patent No.: US 6,373,463 B1
(45) Date of Patent: Apr. 16, 2002

(54) CURSOR CONTROL SYSTEM WITH TACTILE FEEDBACK

(75) Inventor: Douglas W. Beeks, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/172,539

(22) Filed: Oct. 14, 1998

(51) Int. Cl.[7] .................................. G09G 5/00
(52) U.S. Cl. ................. 345/156; 345/157; 345/160; 345/162; 345/163; 345/145; 345/146
(58) Field of Search ................. 345/157, 158, 345/156, 163, 162, 145, 146, 160

(56) References Cited

U.S. PATENT DOCUMENTS

| | | | | |
|---|---|---|---|---|
| 5,424,756 A | * | 6/1995 | Ho et al. ................... | 345/158 |
| 5,870,080 A | * | 2/1999 | Burnett et al. .............. | 345/163 |
| 5,973,670 A | * | 10/1999 | Barber et al. ............... | 345/157 |
| 5,973,689 A | * | 10/1999 | Gallery ...................... | 345/157 |
| 6,061,004 A | * | 5/2000 | Rosenberg .................. | 345/163 |
| 6,137,479 A | * | 10/2000 | Olsen et al. ................ | 345/169 |
| 6,166,723 A | * | 12/2000 | Schena et al. .............. | 345/157 |

OTHER PUBLICATIONS

I.S. MacKenzie, Fitts' Law as a Performance Model in Human–Computer Interaction, 1991, Doctoral Dissertation, University of Toronto.

I.S. MacKenzie, A. Sellen and W. Buxton, A Comparison of Input Devices in Elemental Pointing and Dragging Tasks, 1991, Proceedings of the Chi '91 Conference on Human Factors in Computing Systems, pp. 161–166.

I.S. MacKenzie and W. Buxton, Extending Fitts' Law to Two–Dimensional Tasks, 1992, Proceedings of the CHI '92 Conference on Human Factors in Computing Systems, pp. 219–226.

I.S. MacKenzie and W. Buxton, The Prediction of Pointing and Dragging Times in Graphical User Interfaces, 1994, Interacting with Computers, 6, 213–227.

I.S. MacKenzie, Input Devices and Interaction Techniques for Advanced Computing, 1995, Virtual Environments and Advanced Interface Design, pp. 437–470.

I.S. MacKenzie, Movement Time Prediction in Human–Computer Interfaces, 1995, W. A. S. Buxton, J. Grudin & S. Greenberg (Eds.) Readings in Human Computer Interaction (2nd ed.) (pp. 483–493) (Reprint of MacKenzie, 1992).

R. William Soukoreff and I. S. MacKenzie, Generalized Fitt's Law Model Builder, 1995, Companion Proceedings of the CHI '95 Conference on Human Factors in Computing Systems, pp. 113–114.

M. Akamatsu and I. S. MacKenzie, Movement Characteristics Using a Mouse with Tactile and Force Feedback, 1996, International Journal of Human–Computer Studies, 45, 483–493.

I.S. MacKenzie and A. Oniszczak, A Comparison of Three Selection Techniques for Touchpads, 1998, Proceedings of the CHI '98 Conference on Human Factors in Computing Systems, pp. 336–343.

* cited by examiner

Primary Examiner—Richard Hjerpe
Assistant Examiner—Ali Zamani (57) ABSTRACT

A cursor control system suitable for interactive use with an application program, and in response to specific conditions associated with the application program, the cursor control system provides tactile feedback that can be felt by the user. In particular, when the cursor or pointer indicates a selectable component of the Graphical User Interface (GUI), the cursor control system will provide tactile feedback to the user. In addition, when a valid selection is made on the GUI, the cursor control system will also provide tactile feedback to the user.

19 Claims, 8 Drawing Sheets

CURSOR CONTROL SYSTEM WITH TACTILE FEEDBACK

BACKGROUND OF THE INVENTION

1. Field of the Invention

The present invention generally relates to computer cursor pointing devices, and, more particularly, to computer cursor pointing devices with tactile feedback.

2. Description of the Related Art

In many computer applications, the current trend is toward moving the user interface to a graphical user interface (GUI). When using a GUI, the user accesses the functionality of the computer application by manipulating a computer-generated pointer rendered on the display screen. One way that the user manipulates the pointer is by maneuvering a computer cursor pointing device. Devices used for this operation to date include joysticks, trackball devices, mouse devices, and touchpad devices. The pointer on the screen tracks the movement of the computer cursor pointing device. For example, when using a touchpad, the pointer on the screen will track the movement of the user's finger on the touchpad. When the pointer is over a selectable component of the GUI such as a menu button, the user can select the menu button by pressing a select button on the computer cursor pointing device.

One shortcoming of the prior art is that the user will only receive limited feedback from the GUI and the computer cursor pointing device. Typically the only feedback received by the user is visual. For example, the menu button on the GUI might highlight or provide some other visual indication when selected. The only feedback from the computer cursor pointing device may be a clicking sound when the select button is physically depressed. Thus, it is imperative that the user maintains a high visual awareness of the GUI in order to use the GUI correctly. This high visual awareness can present problems in an environment such as an aircraft cockpit where the user only has a limited amount of time to look at the GUI.

GUIs are becoming increasingly popular in the context of modern aircraft flight deck controls. In the past, the pilot accessed many of the aircraft flight deck controls by manipulating knobs and buttons with his hands. The pilot could use his or her sense of touch to distinguish between the different control knobs and buttons. However, in modem cockpits, the relocation of control functionality to the GUI of a computer screen has limited the pilot's ability to use their sense of touch. This direction has led to the increased reliance on the pilot to manipulate control functions with one or more computer cursor pointing devices. As already discussed, presently known computer cursor pointing devices are limited in their ability to provide feedback to the user. Usually, the only feedback to the user is the visual feedback provided by a change in the display when the pointer is moved over a selectable region of the display. Some systems will also provide aural feedback from button presses. However, in a noisy cockpit, the aural feedback can easily be muffled by ambient noise.

In the cockpit, it is of utmost importance that the pilot can quickly and accurately locate functions on the GUI. The need to visually locate a pointer on the GUI has led to an increased heads down time for the pilot. This increased heads down time can lead to a reduced ability to maintain situational awareness. If the computer cursor pointing device could provide feedback to the user in the form of a motion or tactile movement, then the user could use their sense of touch to aid in locating the pointer on the GUI. This would lead to a reduced amount of heads down time for the pilot, and would increase their situational awareness.

Other examples of environments where the user has minimal time to focus on the GUI include vehicle operations, operating rooms, and military battlefields. Accordingly, the above shortcomings associated with aircraft cockpit GUIs can also be associated with other GUI applications.

Several computer cursor pointing devices that provide tactile feedback to the user are known. However, these prior art devices suffer from a number of practical limitations. For example, the article by M. Akamatsu, et al., entitled *A Comparison of Tactile, Auditory, and Visual Feedback in a Pointing Task Using a Mouse-Type Device*, Ergonomics 38, 816–827, discloses a mouse that provides tactile feedback via a solenoid-driven pin that projects through a hole in one of the mouse buttons. This mouse would be of limited use in an environment where space is limited, e.g., an aircraft cockpit. Touchpads, trackballs, or joysticks are commonly employed in such environments because they require less space for use. The above prior art mouse is also limited in that it only provides one type of tactile feedback, i.e., the protruding pin. A single type of tactile feedback is incapable of distinguishing between different areas of the GUI or different operations performed by the user. Another limitation of the above prior art mouse is that the user must keep his or her finger over the hole at all times in order to feel the protruding pin. This is not useful in an environment such as an aircraft cockpit where such delicate manipulation of a mouse is not feasible.

Another prior art device is disclosed in the article by I. S. MacKenzie, et al., entitled *The Tactile Touchpad*, Extended Abstracts of the CHI '97 Conference on Human Factors in Computing Systems, 309–310. However, this touchpad device is also limited as it is merely configured to provide tactile feedback to simulate a mouse button press and release. This touchpad device does not allow the user to reduce their visual awareness of the GUI by providing tactile feedback when the pointer is over a selectable component of the GUI such as a menu button.

A system is thus needed which overcomes the shortcomings of the prior art.

SUMMARY OF THE INVENTION

A cursor control system according to various aspects of the present invention is configured to provide tactile feedback that can be felt by the user. The cursor control system is suitable for interactive use with an application program on a computer. The tactile feedback is useful when the user wants to minimize the amount of time that is spent looking at the Graphical User Interface (GUI) of the application program. For example, in an aircraft cockpit, the present invention can reduce the amount of user head down time without affecting the user's ability to use the GUI in an efficient and accurate manner.

In particular, the cursor control system responds to specific conditions associated with the application program by providing tactile feedback that can be felt by the user. For example, when the cursor or pointer indicates a selectable component of the GUI, the cursor control system may cause the pointing device to vibrate, shake, or the like. In addition, when a valid selection is made on the GUI, the cursor control system may provide a distinguishable form of tactile feedback to the user.

BRIEF DESCRIPTION OF THE DRAWINGS

A preferred embodiment of the invention is particularly pointed out and distinctly claimed in the concluding portion of the specification. The preferred embodiment, however, both as to organization and method of operation, may best be understood by reference to the following description taken in conjunction with the claims and the accompanying drawings, in which like parts may be referred to by like numerals:

DETAILED DESCRIPTION OF THE PREFERRED EXEMPLARY EMBODIMENTS

The subject matter of the present invention is particularly suited for use in connection with aircraft cockpits. As a result, the preferred exemplary embodiment of the present invention is described in that context. It should be recognized, however, that such description is not intended as a limitation on the use or applicability of the present invention, but is instead provided merely to enable a full and complete description of a preferred embodiment. On the contrary, various aspects of the present invention may be applied to a wide array of uses.

Figure 1:
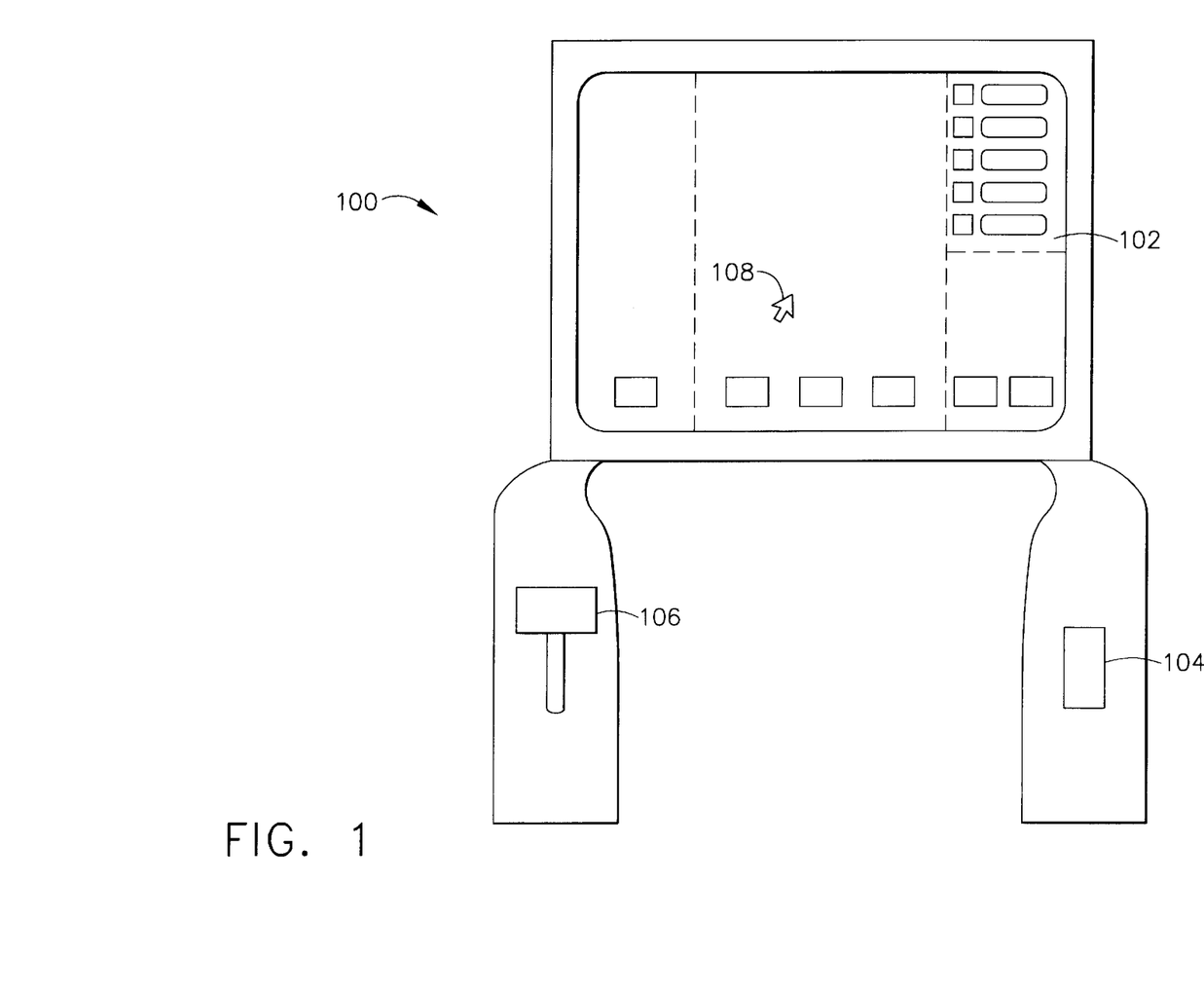
FIG. 1 illustrates a representative layout of an aircraft cockpit.

Referring now to FIG. 1, a representative layout of an aircraft cockpit 100 includes a display 102, a pointing device 104, and a throttle 106. The pilot uses the pointing device 104 to manipulate a pointer 108 that is generated by the particular software application and rendered on the display 102. The pointing device 104 could be a joystick, trackball, touchpad, mouse or some other type of computer cursor pointing device.

Figure 2:
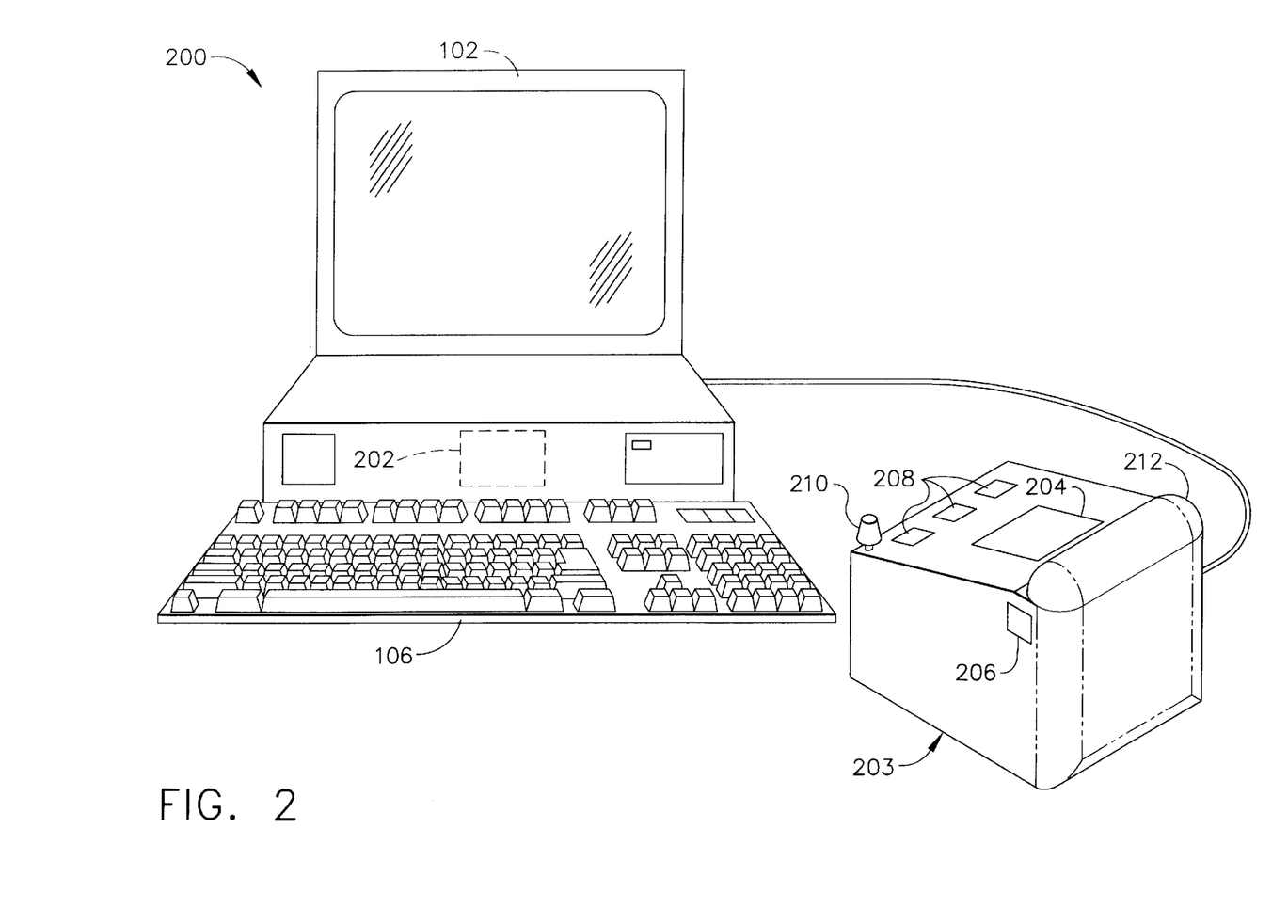
FIG. 2 is a perspective view of a computer system with an exemplary tactile feedback pointing device with portions hidden from view outlined with broken lines.

Referring now to FIG. 2, in accordance with a preferred embodiment of the present invention, a computer system 200 comprises a display 102, a keyboard 106, a main processor 202, and a pointing device 203. The main processor 202 suitably comprises a microprocessor such as an INTEL PENTIUM II or a DEC ALPHA chip. However, alternative embodiments could employ computer systems with other microprocessors running any operating system such as WINDOWS 95, UNIX, or VAX/VMS. The particular type of microprocessor or operating system utilized by computer system 200 is not a limitation on the scope of the present invention.

The pointing device 203 preferably includes an input device element 204 which is used to receive input information from the user. In the preferred embodiment, the input device element 204 is a touchpad. In alternative embodiments, the input device element 204 could be a joystick, mouse, trackball, touch screen or other suitable input element. On one end of the preferred pointing device 203 is a palm rest 212. When using the pointing device 203, the user could rest their palm on the palm rest 212, and use one of their fingers in conjunction with the input device element 204. This is described in greater detail below.

In the preferred embodiment, the pointing device 203 has at least one select button 206 which is used to select a component of the GUI or image. The pointing device 203 also has mode select buttons 208 located on the opposite end of the pointing device 203 from the palm rest 212. The mode select buttons 208 may be used to change GUI screens or images on the display 102. A data set knob 210 can be used to enter information such as a zoom scale factor for a map. Typically, the data set knob 210 is used to enter a value on a sliding scale such as a zoom scale factor or to tune a radio. In alternative embodiments, the mode select buttons 208 and/or data set knob 210 may not be present, or any number of additional buttons, knobs, switches, or the like may be employed.

Figure 5:
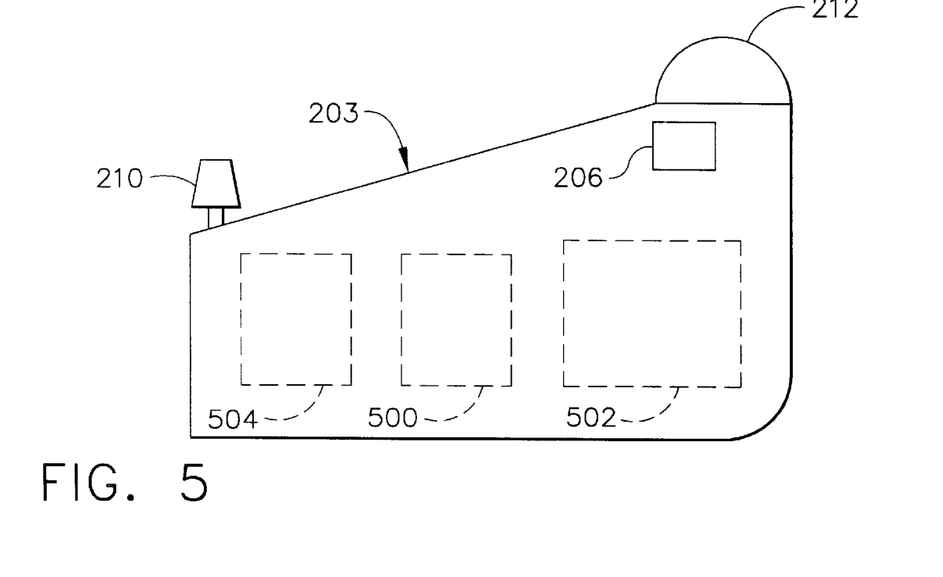
FIG. 5 is a side elevational view of the pointing device shown in FIG. 2.

Referring now to FIG. 5, the pointing device 203 preferably comprises a pointing device processor 500 and at least one motion inducer. The pointing device processor 500 may comprise a standard microcontroller such as a BASIC STAMP microcontroller from PARALLAX Inc. In the preferred embodiment, the motion inducers include a vibrating source 502 and a bumping source 504. The vibrating source 502 may comprise a pager vibration motor such as a 1.3V pager vibration motor (part #11046-MD) from Marlin P. Jones & Assoc. The bumping source 504 may comprise a 6V mechanical solenoid which is available from a wide variety of vendors. In the preferred embodiment as illustrated, there are two types of motion inducers, but in alternative embodiments there could be more than two types of motion inducers.

Figure 8:
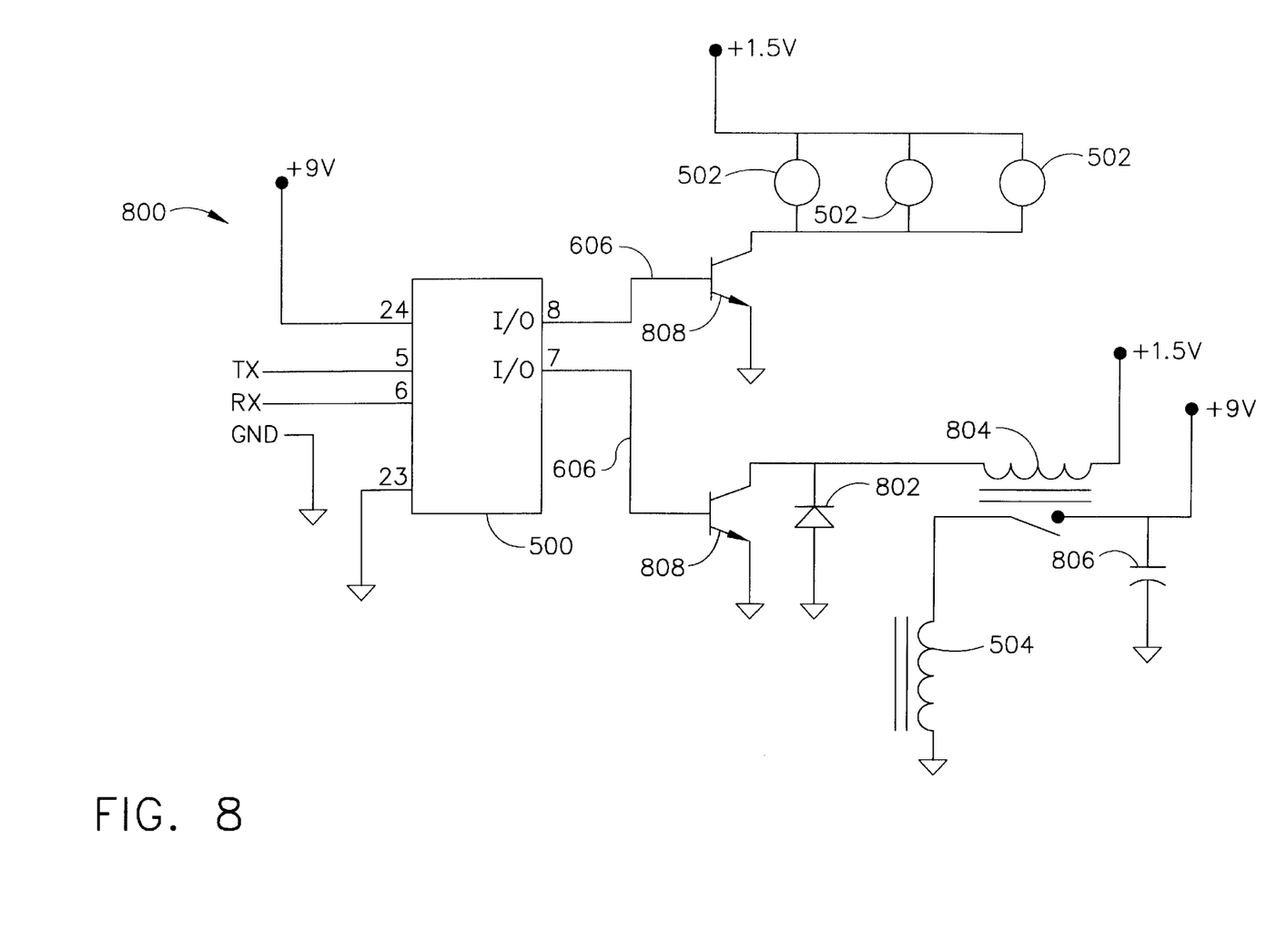
FIG. 8 is a schematic circuit diagram of an exemplary pointing device circuit.

Referring now to FIG. 8, a practical embodiment of a pointing device circuit 800 may comprise a pointing device processor 500, a bumping source 504, a vibrating source 502, a plurality of transistors 808, a diode 802, a relay 804, for example a 5V mini relay, and a capacitor 806, for example a 4700 μF 35V electrolyte capacitor. In response to a suitable output from pointing device processor 500, vibrating source 502 may be activated via one of the transistors 808. Similarly, in response to a suitable output from pointing device processor 500, the relay 804 will be triggered via one of the transistors 808, which in turn will cause the capacitor 806 to activate the bumping source 504.

Figure 9:
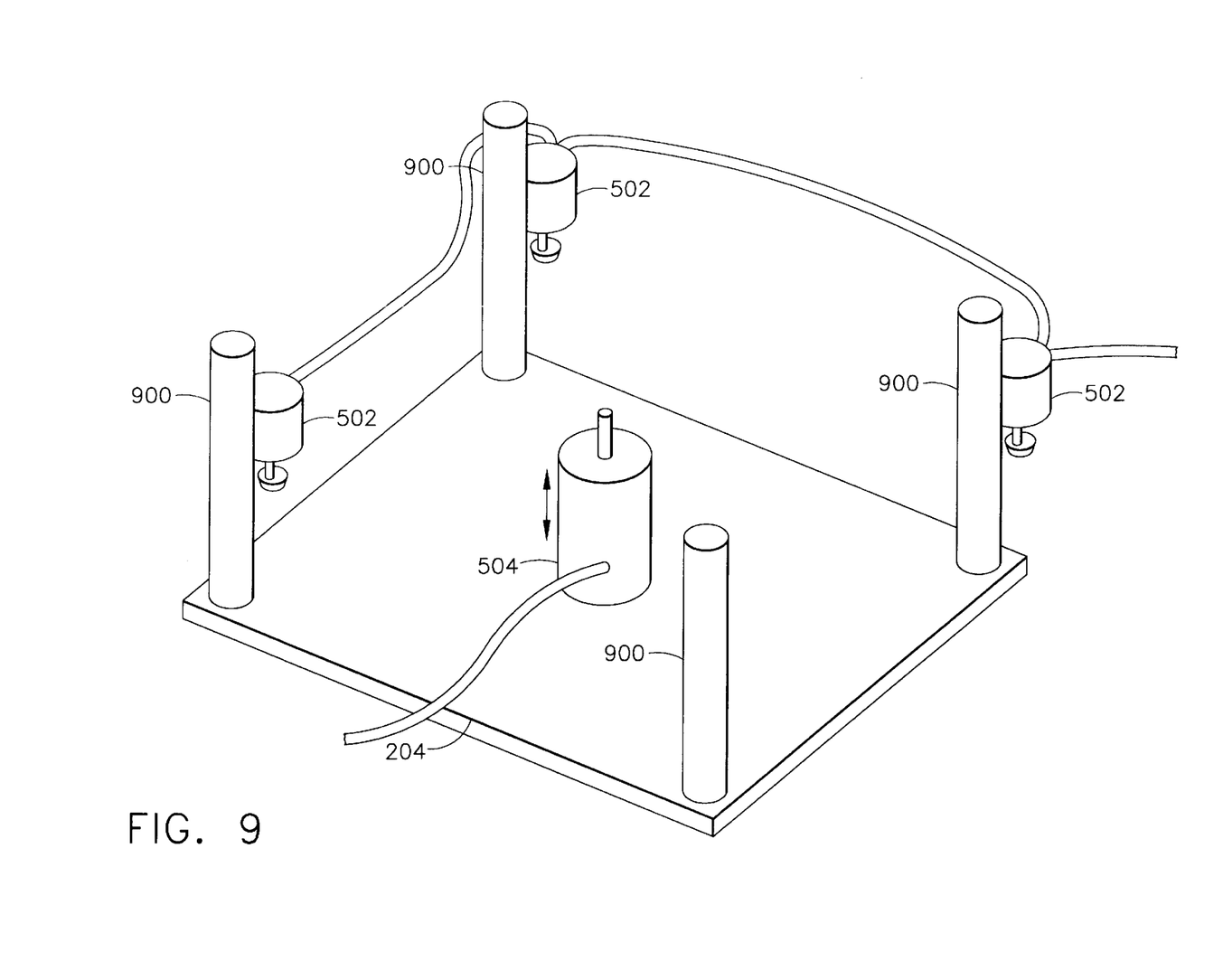
FIG. 9 illustrates connecting motion inducers to the touchpad of the pointing device.

Referring now to FIG. 9, in the preferred embodiment, the input device element 204 is mounted to the pointing device 203 (entire pointing device not shown in FIG. 9) by four mounting screws 900. The vibrating source 502 is attached to the mounting screws 900. In the preferred embodiment as illustrated, the vibrating source 502 may include three vibrating pager motors as discussed earlier. The bumping source 504 is preferably mounted perpendicular to the underside of the input device element 204. In the preferred embodiment, the bumping source 504 is a mechanical solenoid as discussed earlier. When the armature of the solenoid is extended, it will contact the underside of the input device element 204 and cause a bumping sensation. This bumping sensation is a detectable motion that the user will feel and be able to distinguish from other tactile feedback from the pointing device 203. This bumping sensation is one form of tactile feedback that is directed to the user via pointing device 203. In alternative embodiments, the bumping source 504 might not be attached to the underside of the input device element 204. Instead, the bumping source 504 might be attached to a component associated with the input device element 204 such as the housing of the pointing device 203. Also, in alternative embodiments, the vibrating source 502 might be attached away from the mounting screws 900. Instead, the vibrating source 502 might be attached to a component associated with the input device element 204 such as the housing of the pointing device 203.

Figure 6:
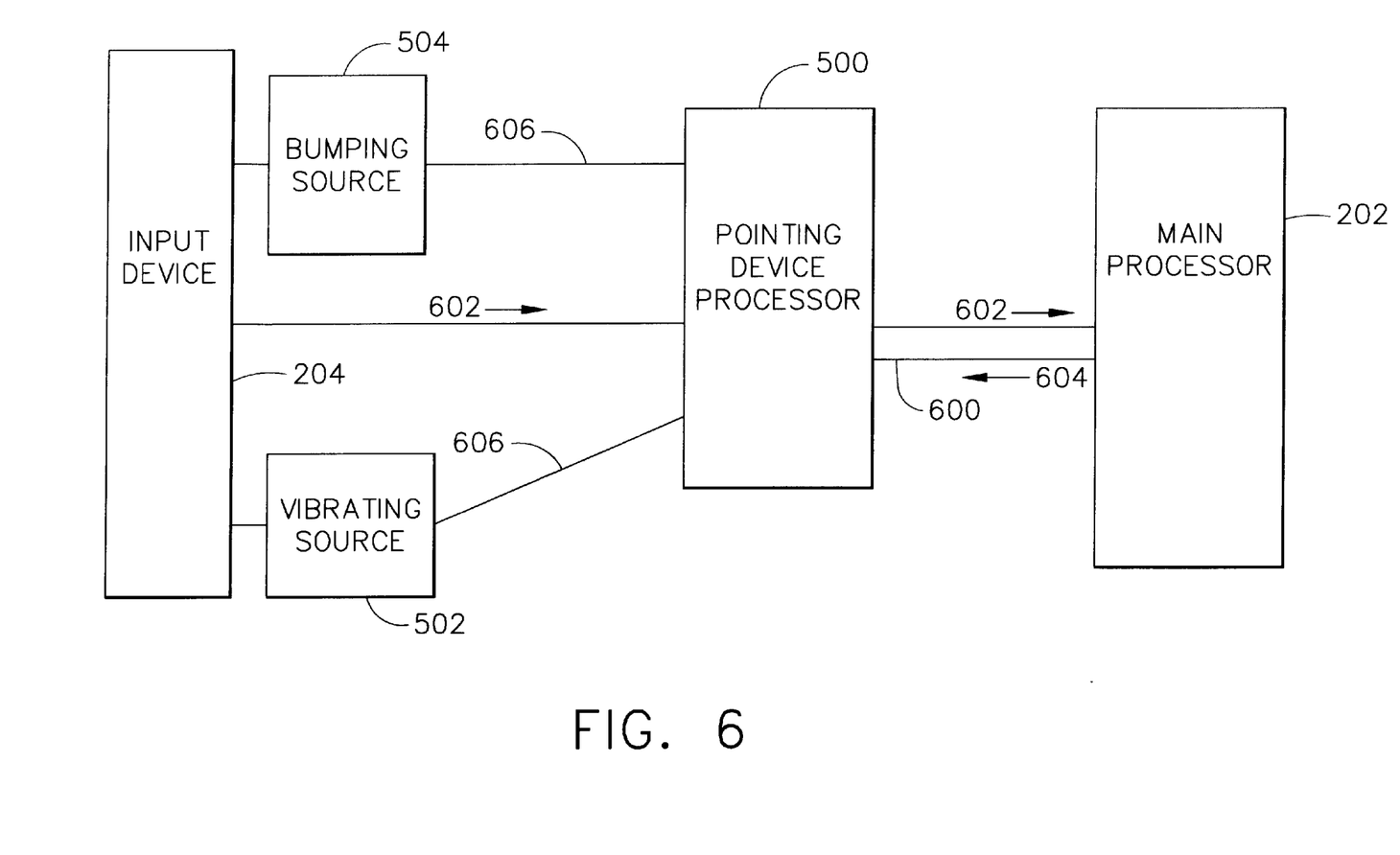
FIG. 6 is a schematic block diagram showing exemplary functional aspects of the pointing device shown in FIG. 2.
Figure 7:
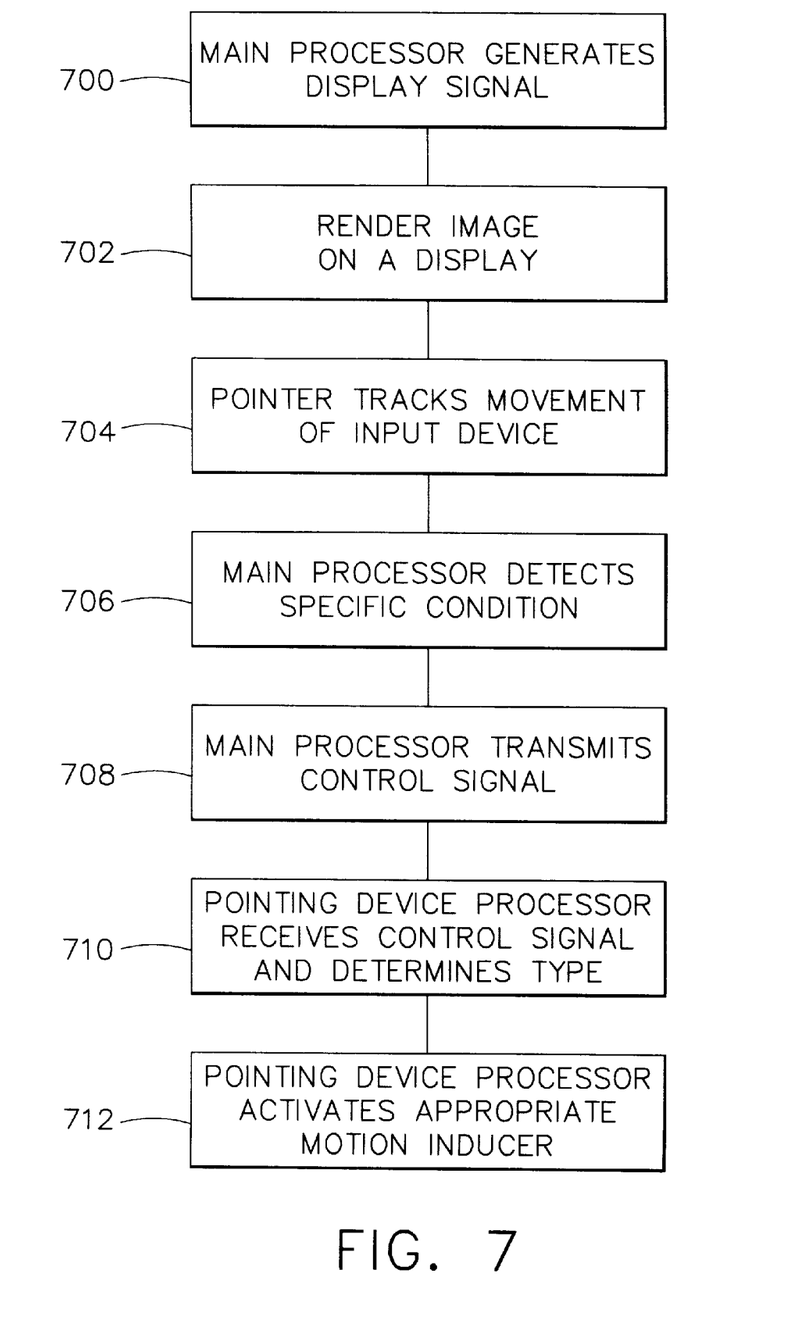
FIG. 7 is a flow chart setting forth the exemplary operation of the tactile feedback pointing device in accordance with the present invention.

As illustrated in FIG. 6, the pointing device processor 500 is preferably connected to the main processor 202 by a bidirectional data bus 600. Information signals 602 are passed from the pointing device processor 500 to the main processor 202, and control signals 604 are passed from the main processor 202 to the pointing device processor 500 along the bidirectional data bus 600. The pointing device processor 500 is suitably connected to the bumping source 504 and the vibrating source 502 by conductor wires 606.

Figure 3:
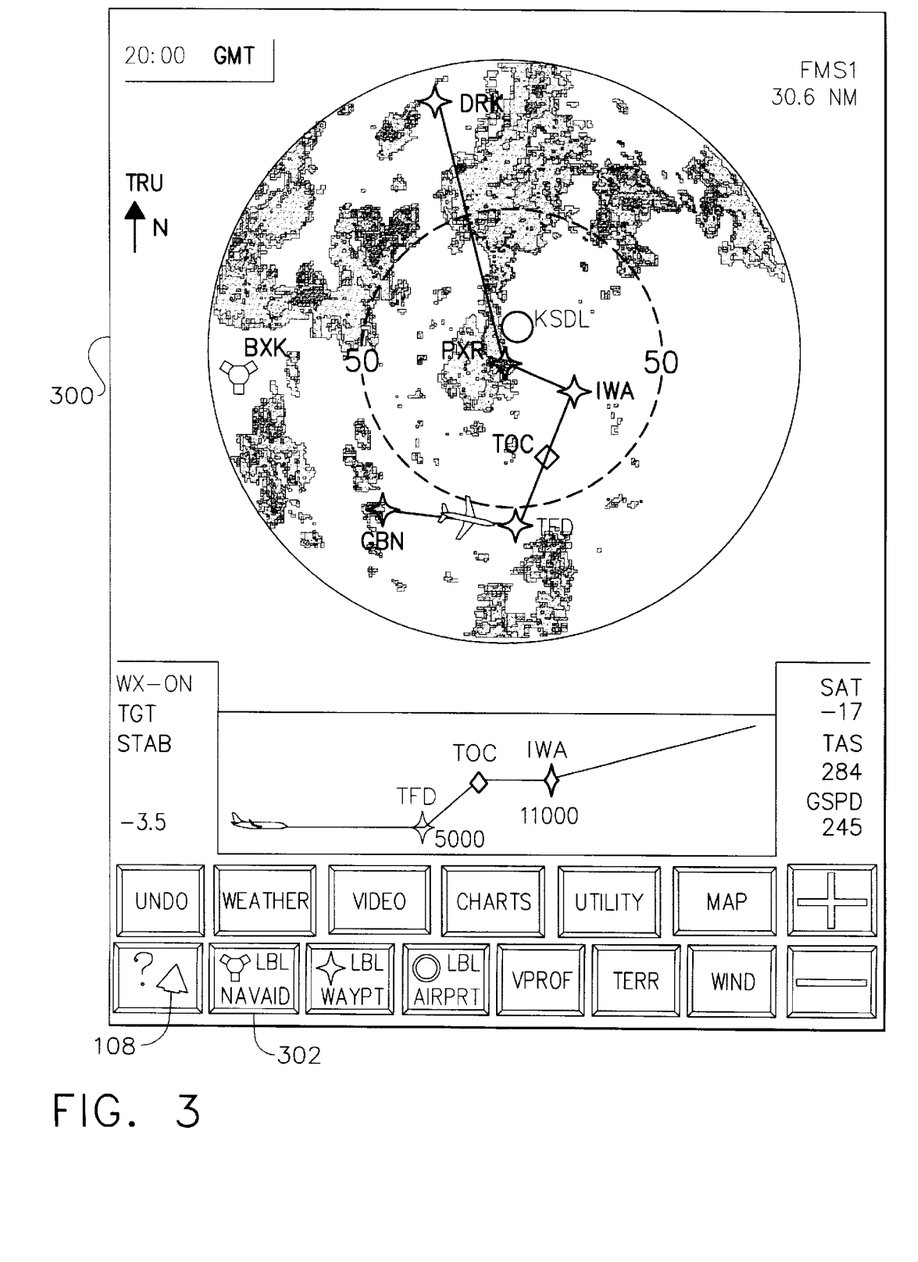
FIG. 3 illustrates a sample graphical user interface for an aircraft computer.
Figure 4:
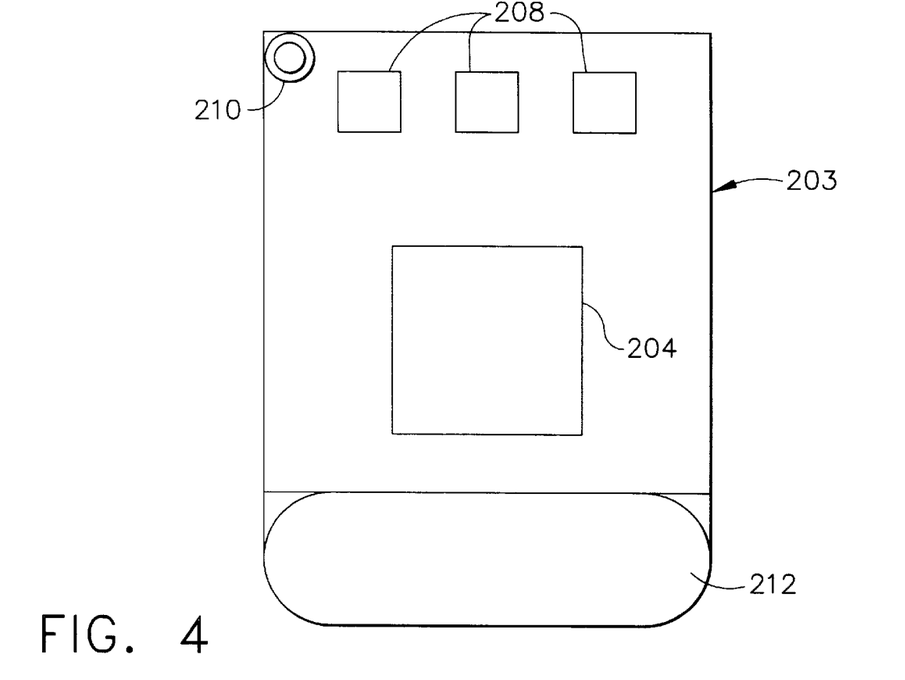
FIG. 4 is a top view of the pointing device shown in FIG. 2.

More particularly, and with reference to FIGS. 4, 5, 6 and 7, the main processor 202 suitably generates display signals that correspond to an image of a GUI screen (step 700). The image is rendered on the display 102 in accordance with conventional techniques (step 702). A sample image or GUI screen is shown in FIG. 3. The image 300 has at least one selectable component 302, e.g., a menu button, and a pointer 108. The selectable component 302 may comprise a menu button, radio button, toggle button, or some other area of the image 300 that could be selected by the user. The pointer 108 tracks the movement of the input device element 204 (step 704), or the movement of an object associated with the input device element 204. For example, as the user's finger moves across the input device element 204 (see FIG. 4), the pointer 108 preferably tracks the movement of the user's finger. An information signal 602 is passed from the input device element 204 to the pointing device processor 500 via a suitable connection. In turn, the pointing device processor 500 may pass the information signal 602 to the main processor 202. The information signal 602 is used by the main processor 202 to generate the appropriate display signals so that the position of the pointer 108 is updated on the image.

In response to specific conditions, the main processor 202 will generate a control signal 604 (step 706). For example, when the pointer 108 is positioned over a selectable component 302 (see FIG. 3), the main processor 202 will detect this and suitably generate a control signal 604. The main processor 202 preferably transmits the control signal 604 to the pointing device processor 500 over the bidirectional data bus 600 (step 708). The pointing device processor 500 receives the control signal 604 and determines the type of the control signal 604 (step 710). In the context of this description, a control signal type is either a vibration control signal or a bumper control signal. Based on the type of control signal 604 received, the pointing device processor 500 activates the appropriate motion inducer (step 712). For example, when the pointer 108 moves over a selectable component, the pointing device processor 500 will activate the vibrating source 502. The vibrating source 502 will vibrate so that the vibration can be felt by the user when he or she touches the pointing device 203. This vibration is another type of tactile feedback directed to the user via pointing device 203. Different types of vibrating or bumping motions can be generated (e.g., slow, medium, fast) so that the user can distinguish between various parts of the image 300. The different types of vibrating and bumping motions can have different frequencies, magnitudes, durations, and the like. In an alternative embodiment, only one type of motion inducer will be present, and the pointing device processor 500 will activate the motion inducer without determining the type of control signal 604 that is received.

More particularly and referring now to FIG. 8, the pointing device processor 500 will send a signal to one of the transistors 808 in order to activate the vibrating source 502. Alternatively, the pointing device processor 500 will send a signal to the other transistor 808 in order to close the relay 804, and cause the capacitor 806 to activate the bumping source 504.

With continuing reference to FIGS. 3, 5, and 6, another example of a specific condition which will cause the main processor 202 to generate a control signal 604 is described. When the user selects a component on the image 300 by pressing a select button 206, an information signal 602 is passed from the pointing device processor 500 to the main processor 202. If the user has selected a valid component, then the main processor 202 will generate a control signal 604. The control signal 604 is passed from the main processor 202 to the pointing device processor 500 over the bidirectional data bus 600. The pointing device processor 500 receives the control signal 604 and determines the type of the control signal. The type may be determined by any number of distinguishable characteristics (e.g., voltage level, digital value, etc.). Based on the type of control signal received, the pointing device processor 500 activates the appropriate motion inducer. Since the control signal 604 may correspond to the depression of the select button 206, the pointing device processor 500 preferably activates the bumping source 504 in response to the activation of the select button 206. The bumping source 504 is preferably configured to contact the underside of the input device element 204 as described above. In this manner, the user can feel the bumping motion on the input device element 204, and the user will be able to distinguish between a valid selection and an invalid selection. An invalid selection would include the situation where the user presses the select button 206 when the pointer 108 is not over a selectable component of the image 300. In that case, the main processor 202 would not generate a control signal 604 and a bumping motion would not be generated.

In another embodiment, the selectable component 302 may not be stationary. For example, the selectable component may comprise a moving target rendered over a map. The user may track the moving target by manipulating the pointer 108 over the moving target, and then select it with a select button 206. If the user makes a valid selection, i.e., the pointer was over a selectable moving target, then the user will feel tactile feedback. This is especially useful in the situation where the moving target is difficult to select because it is moving fast, and the user wants to select it quickly and accurately without spending too much time looking at the image 300.

Although the present invention has been described in conjunction with particular embodiments illustrated in the appended drawing figures, various modification may be made without departing from the spirit and scope of the invention as set forth in the appended claims. For example, additional motion inducers such as a faster vibrating motor may be used. These and other modifications of the preferred embodiment are intended to be within the scope of the following claims.

What is claimed is:

1. A cursor control system for interactive use with an application program, said system comprising:
   a pointing device configured to receive information from a user;
   a plurality of motion inducers configured to provide tactile feedback to said user via said pointing device; and a pointing device processor configured to determine which one of said plurality of motion inducers to activate and to activate said determined motion inducer in response to specific conditions associated with said application program, wherein said pointing device processor is housed within said pointing device.

2. The cursor control system of claim 1, wherein one of said plurality of motion inducers is configured to generate a concussive force to said pointing device.

3. The cursor control system of claim 1, wherein one of said plurality of motion inducers is configured to generate a concussive force to a component associated with said pointing device.

4. The cursor control system of claim 1, wherein one of said plurality of motion inducers is configured to generate a vibrating force to said pointing device.

5. The cursor control system of claim 1, wherein one of said plurality of motion inducers is configured to generate a vibrating force to a component associated with said pointing device.

6. The cursor control system of claim 1, wherein said pointing device further comprises an input device configured to receive information from the user, and wherein each of said plurality of motion inducers induces motion to said input device.

7. The cursor control system of claim 6, wherein said input device comprises a touch pad.

8. The cursor control system of claim 6, wherein said input device comprises a trackball.

9. The cursor control system of claim 6, wherein said input device comprises a joy stick.

10. The cursor control system of claim 6, wherein said input device comprises a mouse.

11. A cursor control system for use by a user, comprising:
    a main processor configured to generate display signals, wherein said display signals include signals corresponding to an image having at least one selectable component and a pointer, and wherein said main processor is configured to generate a control signal associated with a position of said pointer;
    a display responsive to said display signals from said main processor and configured to render said image based on said display signals; and
    a pointing device, wherein said pointing device comprises:
        an input device configured to receive information from the user and generate input signals based on said information;
        a plurality of motion inducers configured to provide tactile feedback to the user via said pointing device in response to a received control signal; and
        a pointing device processor configured to receive said input signals from said input device, transmit said input signals to said main processor, receive said control signal from said main processor, determine which of said plurality of motion inducers to activate in response to said control signal, and transmit said control signal to said determined motion inducer, wherein said pointing device processor is housed within said pointing device.

12. The cursor control system of claim 11, wherein said input device comprises a touch pad.

13. The cursor control system of claim 11, wherein said input device comprises a trackball.

14. The cursor control system of claim 11, wherein said input device comprises a joy stick.

15. The cursor control system of claim 11, wherein said input device comprises a mouse.

16. The cursor control system of claim 11, wherein one of said plurality of motion inducers comprises a bumping source.

17. The cursor control system of claim 11, wherein one of said plurality of motion inducers comprises a vibrating source.

18. The cursor control system of claim 17, wherein said vibrating source is configured to induce different vibrations, in response to different control signals received from said main processor.

19. A method for providing tactile feedback for an input device associated with a computer system that runs an application program, said input device having a pointing device processor electrically connected to a plurality of motion inducers, wherein said pointing device processor is housed within said input device, said method comprising the steps of:
    generating display signals from a main processor, wherein said display signals include signals corresponding to an image having at least one selectable component and a pointer;
    rendering said image on a display;
    transmitting a control signal from said main processor to said pointing device processor when said pointer indicates said selectable component;
    determining, by said pointing device processor, which one of said plurality of motion inducers to activate in response to said control signal; and
    activating said determined motion inducer such that said determined motion inducer imparts a detectable motion to said input device.

* * * * *